United States Patent [19]
Nakano et al.

[11] 4,233,611
[45] Nov. 11, 1980

[54] RECORDING HEAD FOR ELECTROSTATIC PRINTING APPARATUS

[75] Inventors: Keita Nakano, Yokohama; Yasuo Shibata, Atsugi, both of Japan

[73] Assignee: Rank Xerox Limited, London, England

[21] Appl. No.: 967,199

[22] Filed: Dec. 7, 1978

[30] Foreign Application Priority Data

Oct. 14, 1977 [JP] Japan .................................. 52-122322

[51] Int. Cl.$^3$ ............................................. G01D 15/06
[52] U.S. Cl. ................................ 346/155; 346/139 C; 346/153; 178/23 R
[58] Field of Search ............... 178/30, 23; 346/139 C, 346/155, 163, 153

[56] References Cited

U.S. PATENT DOCUMENTS

| 2,003,680 | 6/1935 | DeForest | 346/163 |
| 3,484,550 | 12/1969 | Coulter et al. | 178/30 |
| 3,626,422 | 12/1971 | Lloyd | 346/139 C |
| 3,707,602 | 12/1972 | Glaser et al. | 178/30 |
| 3,774,229 | 11/1973 | Blackwood et al. | 346/139 C |
| 3,956,755 | 5/1976 | Takahasi et al. | 346/155 |
| 4,124,854 | 11/1978 | Kirtikar | 346/155 |

Primary Examiner—Marshall M. Curtis

[57] ABSTRACT

An electrostatic printing apparatus having a transfer medium with a charge retentive surface for forming an electrostatic latent image, and a developer to develop the electrostatic latent image on the transfer medium for transfer to a support material. An array of printing electrodes supported by a flexible insulator abutting the transfer medium are uniformly spaced from the transfer medium.

15 Claims, 5 Drawing Figures

RECORDING HEAD FOR ELECTROSTATIC PRINTING APPARATUS

The invention relates to an electrostatic printing apparatus, and in particular, to an electrostatic printing apparatus having a multi-stylus printing head to create charge patterns on a transfer surface.

Electrostatic printing in its simplest form consists of producing charge patterns on a suitable surface by electric field and then rendering the charge patterns visible and fixed by use of a suitable developer material. Many prior art electrostatic printing devices such as shown in U.S. Pat. Nos. 3,693,181; 3,318,996; 3,810,193; 3,752,288; 3,711,859; and 3,757,352 use a plurality of styli electrodes and a dielectric coated paper or web urged into engagement with the styli electrodes as the web moves past the recording head. A sufficient voltage is developed across selected styli and the web to cause selective charging of the web. The electrostatic pattern is then made visible in a suitable developer station by suitable developer materials. Similar systems in the prior art have a multi-stylus print head transported in an oscillatory fashion across the dielectric coated face of the web with the styli in contact with the web. A difficulty with these systems is the cost and inconvenience in providing a dielectric coated paper or web. Oftentimes other considerations are the wear of the styli in making contact with the recording medium and the contact pressure of the styli against the dielectric paper. It would, therefore, be desirable to provide an electrostatic printer eliminating the need for specially treated recording paper or web and minimizing the wear on the recording styli.

Other prior art electrostatic printers are transfer systems in which the printing styli do not directly apply the charge pattern to the recording medium. A drum with dielectric coating or an endless belt of dielectric material is often used as a transfer surface. In these systems, the transfer surface with a developed image is brought into contact with a plain paper or suitable recording medium. A potential difference of suitable plurality is applied between the transfer surface and the recording medium, removing the developer materials from the transfer surface and attaching the material to the recording medium. A prior art system is disclosed in U.S. Pat. No. 3,792,494 showing an array of styli in nominal contact with a rotating drum having an insulating layer overlaying a photoconductive layer. The printing styli produce an electrostatic latent image on the surface of the insulator layer. The electrostatic latent image is then developed and the developed image transferred to a paper web. Other transfer systems such as disclosed in U.S. Pat. Nos. 3,818,492 and 3,739,087 disclose recording styli making contact with the inside surface of a rotating transfer drum. Other systems such as U.S. Pat. No. 3,673,593 disclose a stylus making contact with a charge retaining coating on a drum support. U.S. Pat. No. 3,701,996 teaches a transfer system having a plurality of styli disposed adjacent the surface of a drum. A difficulty with systems having styli in contact with the surface of a transfer member is to maintain the styli in contact without undue wear on either the styli surfaces or the transfer member surfaces. A difficulty with the systems having the styli in nominal contact with the transfer member or spaced from the transfer member surface is maintaining a uniformly spaced relationship to the surface of the transfer member. It would, therefore, be desirable to provide an electrostatic printer having an array of styli uniformly spaced with respect to the transfer medium without undue wear on the transfer medium or the styli surfaces.

In multi-stylus printing systems producing a charge image either on a dielectric coated paper or a transfer surface, the same physical effects usually occur. A sufficient charge is developed on the individual styli to cause charge carriers to cross the gap between the styli and the coated paper or transfer surface. This charge is often dependent upon the gap between the styli and the transfer surface whether or not the styli are in close contact with the surface or in spaced relation to the surface. In either case the styli should be in uniform contact or uniformly spaced with respect to the surface of the coated paper or transfer medium. This is often difficult, however, because of the unevenness of the surfaces of the transfer medium or coated paper and is particularly serious in a multistylus electrode having an array of styli. It would, therefore, be desirable to provide a multistylus printing system providing a uniform spaced relationship of the styli with respect to the transfer medium or coated paper.

Accordingly, it is a primary object of the present invention to provide an improved multistylus recording head having minimum wear to the styli head and recording surfaces and providing a uniform spaced relationship of the stylus electrodes with respect to the coated paper or transfer surface.

Further objects and advantages of the present invention will become apparent as this description proceeds and the features of novelty characterizing the invention will be pointed out with particularity in the claims annexed to and forming a part of this specification.

Briefly, the present invention is concerned with an electrostatic printing apparatus having a transfer medium with a charge retentive surface for forming an electrostatic latent image, a developer to develop the electrostatic latent image on the transfer medium for transfer to a support material and, in particular, comprising an array of printing electrodes disposed adjacent the transfer medium and supported by a flexible insulator abutting the transfer medium for uniformly spacing the electrodes from the transfer medium.

For a better understanding of the present invention, reference may be had to the accompanying drawings wherein the same reference numerals have been applied to like parts and wherein.

Figure 1:
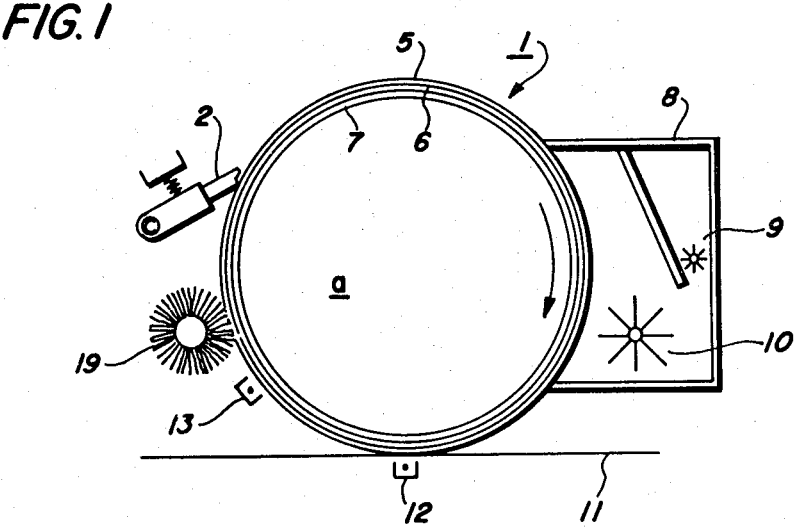
FIG. 1 is a sectional view showing an electrostatic printing apparatus incorporating the present invention.
Figure 3:
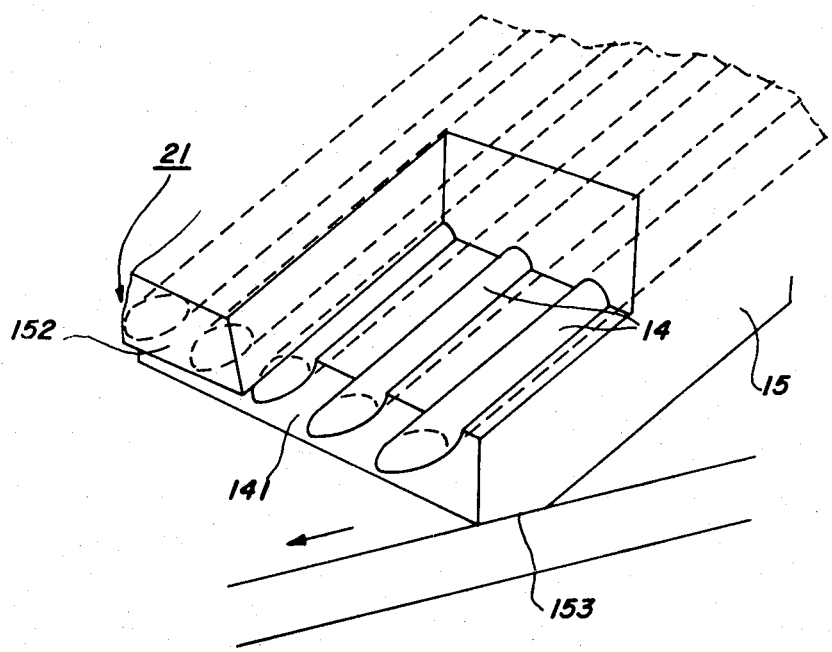
FIG. 3 is an isometric view in section showing the multistylus electrode.

Referring now to FIGS. 1 and 3, there is illustrated an electrostatic printing apparatus comprising a multistylus electrode generally indicated at 2 arranged in a uniform relation to the surface of a photosensitive drum having a transfer medium 1 comprised of a photoconductive layer 6 and an insulating layer 5 laminated on a drum-shaped conductive support 7. The multistylus electrode 2 is comprised of a plurality of equally spaced styli 14 spaced a uniform distance from the insulating layer 5 for scanning the transfer medium 1 with signals sequentially applied to the styli 14 in order to form an electrostatic latent image on the transfer medium 1. The formed latent image is developed at a development station 8 including a toner box 9 and a developer box 10 and is transferred onto a support or copy sheet 11 by the use of a transfer corotron 12. A pre-cleaning corotron 13 is used to discharge the residual electrostatic latent image from the transfer medium 1 and a cleaning brush 19 is used to remove the remaining toner particles on the transfer medium 1 in order that the transfer medium is prepared for the next recording cycle.

Figure 2:
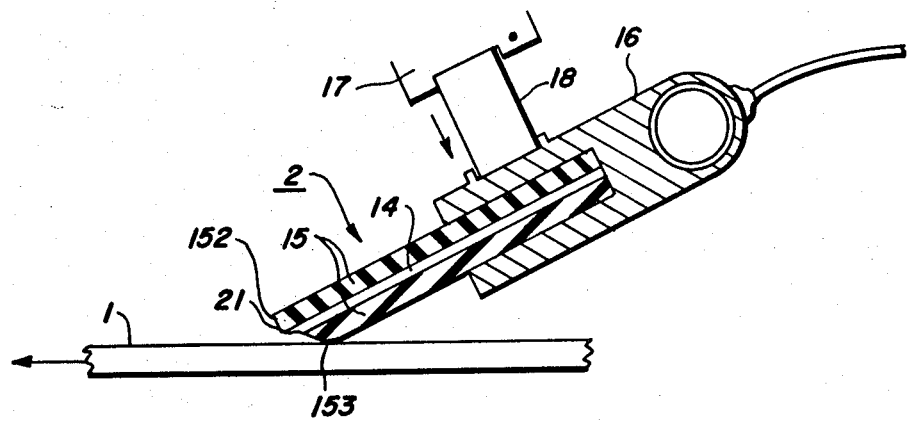
FIG. 2 is a sectional view showing a multistylus electrode in accordance with the present invention in contact with a transfer surface.

Referring to FIGS. 2 and 3, the multistylus electrode 2 is in contact with the surface of the transfer medium 1. The multistylus electrode 2 comprises flexible styli 14 arranged in a plane and covered on both sides with an insulating member 15 so that the styli 14 cannot come into direct contact with the transfer medium surface. The insulating member 15 has its rear part gripped by a brace or support member 16 which is rotatably mounted to a frame (not shown) in order that the multistylus electrode 2 is inclined at an angle relative to the transfer medium 1. In this position, the tip end 21 of insulating member 15 is provided with a lower tip portion 153 in contact with the transfer medium 1. A spring 18 is interposed between the support member 16 and the machine frame 17 to urge the lower tip portion 153 of the multistylus electrode 2 against the surface of the transfer medium 1.

Figure 4:
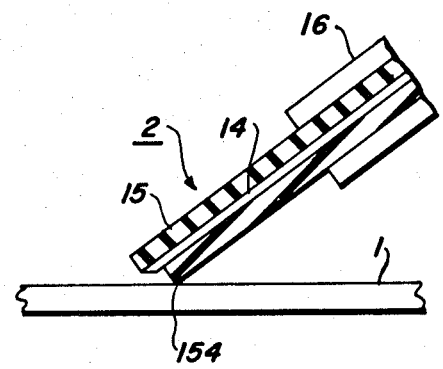
FIGS. 4 and 5 are sectional views showing alternate embodiments according to the present invention of the multistylus electrode in contact with a transfer surface.

FIG. 3 shows the tip end 21 of the multistylus electrode 2 of FIG. 2 in more detail. The tip end 21 of the insulating member 15 is stepped so that the upper half of the styli 14 is covered with the upper tip 152 of the insulating member 15 with the flat portion 141 exposing the styli 14 to the transfer medium. The flat portion 141 communicates with the lower tip portion 153 in sliding contact with the surface of the transfer medium 1 to hold the styli 14 in uniform contact therewith. Although the multistylus electrode 2 is formed at its tip end 21 with a flat lower tip portion 153 in plane contact with the transfer medium surface as shown in FIG. 3, the electrode 2 can be arranged to come into line contact 154 as illustrated in FIG. 4. The multistylus electrode 2 as described provides a superior followability relative to the transfer medium surface regardless of unevenness in the order of ±5 microns on the surface of the transfer medium 10. Thus the styli 14 of the electrode 2 are held in uniform spaced relation to the transfer medium 1. This will reduce the required voltage to be applied to the styli 14. It is apparent that the multistylus electrode of FIG. 3 is higher in wear resistance than that shown in FIG. 4 where the electrode 2 is held in line contact with the transfer medium surface.

Figure 5:
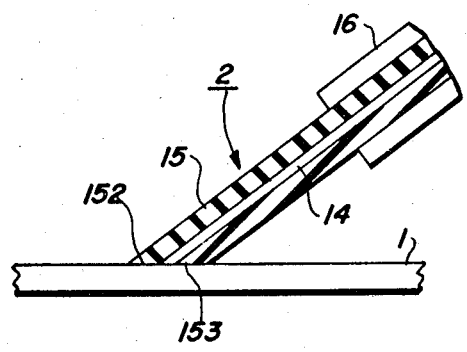

FIG. 5 shows an alternative embodiment wherein the insulating member 15 has a flat portion also at its upper tip end 152 and the styli 14 are in close contact with the surface of the recording medium 1.

The present invention will be more clearly understood with reference to the following Examples.

EXAMPLE 1

A transfer medium 1 was prepared by depositing a Se thin layer 60 microns in thickness on an oxidized aluminum drum surface by evaporation and then by coating with a double fluid hardening polyurethane (trade name Rethane 4026) to form a 10 micron thickness layer. A multistylus electrode 2 of the type as shown in FIGS. 2 and 3 was prepared by covering 80 micron nickel styli equally spaced at a 40 micron distance with urethane rubber (70 degree hardness). The multistylus electrode 2 was inclined at an angle of 30 to 40 degrees relative to the surface of the recording medium 1 in order to provide a space of 20 microns between the tip end of the styli 18 and a recording drum surface. A uniform spacing of 200 mm was obtained over the drum length under a pressure of approximately 1400 g.

EXAMPLE 2

Prepared in this Example was a recording apparatus having the same structure as described in the above Example 1 except that the insulating member 15 of the multistylus electrode 2 is formed of fluororubber (60 degree hardness) in the form as shown in FIG. 4. A uniform spacing of 200 mm was obtained over the drum length under a pressure of about 700 g.

The present invention has been described in detail with reference to preferred embodiments thereof, but it will be understood that variations and modifications can be effected within the spirit and scope of the present invention. For example, the multistylus electrode may have a resilient insulating member having an additional function as a cleaning blade. This will eliminate the need for providing any cleaning means, resulting in an inexpensive recording apparatus. In addition, the spring 40 used to urge the multistylus electrode 2 against the transfer medium surface may be removed from the apparatus by securing the support member 36 to press the multistylus electrode against the recording medium surface.

While the present invention has been described in connection with transfer type electrostatic recording apparatus, there is no intent to limit the spirit and scope of the present invention to these apparatus and it is apparent to those skilled in the art that the present invention can be applied to all electrostatic recording apparatus using a stylus electrode.

What is claimed is:

1. An electrostatic printing apparatus comprising
   a recording medium having a charge retentive surface for forming an electrostatic latent image,
   means for developing the electrostatic latent image formed on the recording medium,
   a support material,
   means for transferring the developed electrostatic latent image to the support material,
   an array of marking electrodes disposed adjacent the recording medium for selectively charging the charge retentive surface, and
   a flexible insulator supporting the marking electrodes, the insulator adjoining the recording medium whereby to uniformly space the array of electrodes from the recording medium.

2. The apparatus of claim 1 wherein the marking electrodes comprise a flexible material.

3. The apparatus of claim 2 wherein the marking electrodes are nickel electrodes spaced about 40 microns from one another.

4. The apparatus of claim 1 wherein the marking electrodes are disposed at an acute angle with respect to the recording medium.

5. The apparatus of claim 4 wherein the marking electrodes are disposed at an angle of between 30 and 40 degrees with respect to the recording medium.

6. The apparatus of claim 1 wherein the flexible insulator is a rubber covering having first and second portions, the marking electrodes being embedded in the rubber between the first and second portions, a first portion of the rubber adjoining the recording medium, a second portion of the rubber overlying the electrodes.

7. The apparatus of claim 6 wherein each of the electrodes comprises an elongated member and a flat tip contiguous with the elongated member, the elongated member being embedded in the rubber covering, the first portion of the rubber covering being offset with respect to the second portion of the rubber covering whereby the flat tip of the electrode is exposed to the recording medium.

8. The apparatus of claim 7 wherein the first portion of the rubber covering is in sliding contact with the recording medium whereby the marking electrodes are uniformly spaced from the recording medium.

9. The apparatus of claim 8 wherein the electrodes are spaced within 100 microns of the recording medium.

10. The apparatus of claim 9 wherein the electrodes are spaced about 20 microns from the recording medium.

11. The apparatus of claim 8 wherein the rubber is urethane rubber.

12. The apparatus of claim 8 wherein the rubber is fluororubber.

13. The apparatus of claim 1 including a spring, the spring biasing the flexible insulator against the recording medium.

14. The apparatus of claim 7 wherein the flat tip of the electrodes and the second portion of the covering adjoins the recording medium.

15. An electrostatic printing apparatus comprising
a recording medium having a charge retentive surface for forming an electrostatic latent image,
means for developing the electrostatic latent image formed on the recording medium,
a transfer material,
means for transferring the developed electrostatic latent image to the transfer material,
a brace,
an array of marking electrodes, disposed adjacent the recording medium for selectively charging the retentive surface, each of the electrodes having an elongated member and a flat tip,
a flexible insulator secured to the brace, the insulator supporting the marking electrodes, the marking electrodes being disposed at an acute angle with respect to the recording medium,
a spring biasing the insulator into contact with the recording medium, the insulator comprising a first portion and a second portion, the second portion overlying the electrodes, the first portion being offset with respect to the second portion exposing the flat tip of each electrode to the recording medium, the first portion contacting the recording medium whereby the electrodes are uniformly spaced within 100 microns of the recording medium.

* * * * *